(12) United States Patent
Harrigan

(10) Patent No.: US 6,747,702 B1
(45) Date of Patent: Jun. 8, 2004

(54) APPARATUS AND METHOD FOR PRODUCING IMAGES WITHOUT DISTORTION AND LATERAL COLOR ABERRATION

(75) Inventor: Michael E. Harrigan, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/220,162

(22) Filed: Dec. 23, 1998

(51) Int. Cl.[7] .................. H04N 5/225; G02B 13/16
(52) U.S. Cl. ............................. 348/335; 348/241
(58) Field of Search ......................... 348/241, 335, 348/207.1, 207.11

(56) References Cited

U.S. PATENT DOCUMENTS

| | | | |
|---|---|---|---|
| 4,178,075 A | * 12/1979 | Rogers | ............... 359/648 |
| 4,583,831 A | 4/1986 | Harvey | |
| 4,647,161 A | 3/1987 | Muller | |
| 5,185,667 A | * 2/1993 | Zimmermann | ......... 348/207.99 |
| 5,276,519 A | * 1/1994 | Richards et al. | ............ 348/241 |
| 5,323,204 A | 6/1994 | Wheeler et al. | |
| 5,461,440 A | 10/1995 | Toyoda et al. | |
| 5,606,365 A | 2/1997 | Maurinus et al. | |
| 5,696,850 A | 12/1997 | Parulski et al. | |
| 5,710,954 A | 1/1998 | Inoue | |
| 5,726,810 A | 3/1998 | Meyers | |
| 5,739,924 A | 4/1998 | Sano | |
| 5,751,863 A | * 5/1998 | Farr | ............... 382/275 |
| 5,818,527 A | * 10/1998 | Yamaguchi et al. | ......... 348/335 |
| 5,825,556 A | 10/1998 | Meyers | |
| 6,281,931 B1 | * 8/2001 | Tsao et al. | ............... 348/247 |
| 6,538,691 B1 | * 3/2003 | Macy et al. | ............... 348/241 |

* cited by examiner

Primary Examiner—Wendy R. Garber
Assistant Examiner—Matthew L Rosendale
(74) Attorney, Agent, or Firm—Svetlana Z. Short (57) ABSTRACT

According to one aspect of the invention, an apparatus for forming distortion free images comprises: (i) a rotationally symmetric lens system capable of forming a distorted image and of introducing lateral color aberration; (ii) a photosensitive image capture medium capable of capturing the distorted image created by the lens system; (iii) an image storage medium storing the distorted image captured by the image capture medium; (iv) an image buffer medium (area) for holding at least one distorted image stored by the image storage medium; and (v) an image processing unit correcting the distorted image and creating an undistorted image. The image processing unit has information describing distortion and lateral color aberration characteristics of the lens system. The image processing unit calculates, for at most one quadrant of the image, given any ideal radial position of a pixel, the actual radial position of the distorted data pixel from which to retrieve the data. Then the image processing unit moves the data corresponding to the radial value of the pixel with the distorted data to its undistorted pixel location in each quadrant of the image, thereby building a corrected image. The corrected image is stored in the image buffer medium; and then moved from the buffer to the image storage medium.

15 Claims, 7 Drawing Sheets

APPARATUS AND METHOD FOR PRODUCING IMAGES WITHOUT DISTORTION AND LATERAL COLOR ABERRATION

FIELD OF THE INVENTION

This method relates to an electronic correction method of distortion and lateral color aberrations introduced by lenses.

BACKGROUND OF THE INVENTION

Distortion is an optical aberration introduced by a lens. Because of this aberration bowed lines instead of straight lines are created in a picture. Most camera lenses are designed to have less than 2% distortion. This amount of distortion is approximately what is just noticeable in a picture to a typical picture taker. Lateral color aberration is another aberration that often limits the lens performance. Lenses that suffer from this aberration create multiple different color images that overlap only partially, producing color fringing in the images. This color fringing reduces image quality. Lateral color aberration can be corrected with additional lens elements and judicial choice of lens materials, but this increases the complexity of lenses and their cost.

The need to minimize distortion and lateral color aberration is often balanced against the need to correct other aberrations and, as a consequence, other aberrations are either allowed to increase in order to have a lens with a reasonable amount of distortion and lateral color or, alternatively, additional lens elements are used to control these other aberrations. Furthermore, distortion and lateral color aberrations increase with increasing field of view. Because of the need to keep distortion and lateral color aberrations small, the field of view of many conventional taking lenses does not exceed 100 degrees. For example, a typical wide angle lens for 35 mm cameras has a full field of view of about 84 degrees. Even in a specially designed very wide angle lenses which contain a large number of lens elements the field of view is limited to approximately 100 degrees by distortion and lateral color aberrations.

Some wide angle lenses have much more than 2% distortion. For example, fisheye lenses have very large fields of view and because of this have a very large amount of distortion. Thus, a person who needs to take pictures with a very wide angle lens, (i.e. a lens that has a field of view of above 100 degrees) often has to settle for very distorted pictures. A distortion of 6% or more is very noticeable. A good example of a fisheye lens is disclosed in U.S. Pat. No 4,647,161. Except for distortion, this fisheye lens has an excellent image quality which is achieved with no vignetting over a total angular field of greater than 150 degrees. However, this lens suffers from 70% distortion. Thus, such lens would produce a very distorted an image.

In addition, lateral color aberration is very difficult to correct in wide angle lenses. Lateral color aberration also increases with the field angle because the image forming bundles of light pass through the periphery of some lens elements. Thus, images formed by such wide angle lenses often exhibit color fringing near the edges.

It is well known that single lens reflex cameras (also known as SLR cameras) employ a flipable mirror positioned between the taking lens and the image plane. It is difficult to control distortion in lenses designed for such cameras because these cameras require a minimum back focus distance in order to allow the mirror to flip out of the way during exposure. When the field angle is in the wide angle region (above about 45 degrees), this requirement forces the back focal length (i.e., the distance along the optical axis from the rear lens surface to the image surface) of the lens to be greater than the focal length of the lens. In order to achieve a back focal length that is greater that the focal length, the lens has to be of a retro-focus type. Such lenses have a front negative power lens group followed by a rear lens group of positive power. The asymmetry of this design form makes coma, lateral color and distortion aberrations more difficult to correct, limiting the maximum field of view of the lens. If the total field angle of the lens is required to be very wide, such as above 100 degrees, aberration control becomes especially difficult, and the lens becomes complex, bulky and very expensive.

It is desirable to have compact zoom lenses with a small number of lens elements that provide a large zoom range and an excellent image quality. However, many zoom lenses suffer from distortion and/or lateral color aberrations in one or more of their zoom positions. Of course, additional lens elements may be employed to correct for distortion and lateral color, but this raises the complexity and the cost of these zoom lenses. Furthermore, many zoom lenses have limited zoom ranges because distortion and lateral color aberrations have to be controlled in each of the zoom positions. Thus, distortion and lateral color are often limiting factors that determine the total zoom range of a zoom lens. For example, good five element zoom lenses, such as those disclosed in U.S. Pat. Nos. 5,825, 556 and 5,726, 810 have fields of view in their wide angle mode of about 30 degrees and provide a zoom ratio of about 2X. The field of view and the zoom range of these lenses are limited by the need to control distortion in each zoom position to about 2% or less and the need to control the lateral color aberration.

U.S. Pat. No. 5,461,440 discloses a photographic image correction system for correcting degraded images for distortion and light irregularity. The distortion is corrected by knowing the location of the distorted data and, then, by solving a complicated equation to find the ideal pixel location for that data. This is done for each pixel in the image medium. The calculation of the ideal pixel location using this equation for each pixel of the image medium is excessively time consuming. Once the ideal pixel location for a given image data is determined, the image data for the ideal pixel is calculated by area weighted average of four adjacent pixels. This averaging operation acts as a smoothing filter. Therefore, due to this averaging operation some of the image information is lost. This is undesirable.

Furthermore, the disclosed technology is based is based on use of conventional camera lenses and photographic film. The original negative with a distorted image is scanned by a film scanner and a new (improved) image is produced by a printer. No adjustment is made for the difference in the amount of pixels in distorted versus undistorted image, and in case of the pin cushion distortion (unless used with a smaller field of view) some of the data near the edge of the film is lost.

U.S. Pat. No. 5,739,924 is directed to a photographic image printing apparatus capable of correcting image quality. This patent discloses image sharpening for a moving object, which results in focus error, using a subtraction of a Laplacian function of the image data from the image data itself. That is, the disclosed method emphasizes the outlines of the image. This patent is silent with respect to distortion or lateral color correction.

SUMMARY OF THE INVENTION

An object of the present invention is to provide a method and an apparatus for correcting distortion and lateral color introduced by lenses. Another object of the present invention is to provide a distortion and lateral color correction method that is simple and more efficient than that of the prior art. Another object of the present invention is to efficiently use sensor arrays capturing the distorted image.

According to one aspect of the present invention, an apparatus comprises: a lens with a predetermined full field angle of more than 50 degrees, the lens having at least 6% distortion; and a sensor array receiving a distorted image created by the lens. At this full field angle, the distorted image just fits within the sensor array and paraxial image corresponding to this field angle does not touch the sides of the sensor array.

According to another aspect of the present invention an apparatus comprises: a lens with a predetermined full field angle of more than 50 degrees, the lens having at least 6% distortion; a sensor array receiving a distorted image created by the lens, such that at this full field angle, the distorted image just fits within the sensor array and paraxial image corresponding to this field angle does not touch the sides of the sensor array; and an image processing unit processing the data representing the distorted image and transposing the data to represent an undistorted image.

According to an embodiment of the present invention a method of producing a distortion-free image comprises the following steps:(i) producing an image with at lest 6% distortion; (ii) for a predetermined image location of the distortion-free image finding a corresponding location in the distorted image; (iii) copying data located at the corresponding location of the distorted image into the predetermined image location and copying corresponding data from three other quadrants of the distorted image into their corresponding locations in the distortion-free image. The corresponding image locations are characterized by the same radial distance from the center of the distortion-free image.

According to an embodiment of the present invention, an apparatus for forming distortion free images comprises: (i) a rotationally symmetric lens system capable of forming a distorted image and of introducing lateral color aberration; (ii) a photosensitive image capture medium capable of capturing the 5 distorted image created by the lens system; (iii) an image storage medium storing data that represents the distorted image captured by the image capture medium; (iv) an image buffer for holding data representing the distortion free image; and (v) an image processing unit transposing the data representing the distorted image and creating a set of data that represents an undistorted image. The image processing unit has information describing distortion and lateral color aberration characteristics of the lens system. The image processing unit calculates, for at most one quadrant of the image, given any ideal radial position of a pixel, the actual radial position of the distorted data pixel from which to retrieve the data. Then, the image processing unit moves the data corresponding to the radial value of the pixel with the distorted data to its undistorted pixel location in each image quadrant, thereby building a distortion-free image. The data representing the distortion-free image is stored in the image buffer medium; and then moved from the buffer to the image storage medium.

One of the advantages of the present invention is that it alleviates the need to correct distortion and lateral color in a lens. Thus, very wide angle lens designs could be achieved if distortion need not be corrected in the lens design.

If the lenses are permitted to have large amounts of distortion and lateral color aberrations, other aberrations can be better controlled, the lenses can comprise fewer lens elements, have very wide field angles, and be less expensive. Thus, a lens can be designed to have a very large field of view and a large amount of distortion and lateral color, which will be eliminated digitally. A zoom lens that has excellent performance except for distortion and lateral color will also achieve a larger zoom range and have a wider field angle in its wide angle mode then a comparable zoom lens that is also corrected for distortion and lateral color. If a digital camera is used, the view seen in the viewfinder will be accurately captured in the image, resulting in higher resolution.

DETAILED DESCRIPTION OF THE INVENTION

This embodiment of the present invention is directed to digitized images such as those captured by digital cameras or obtained by digitizing images captured on film. Such images are produced by a lens that suffers from distortion and/or lateral color aberrations, but the distortion and lateral color aberrations are removed as discussed below.

Figures 1, 3:
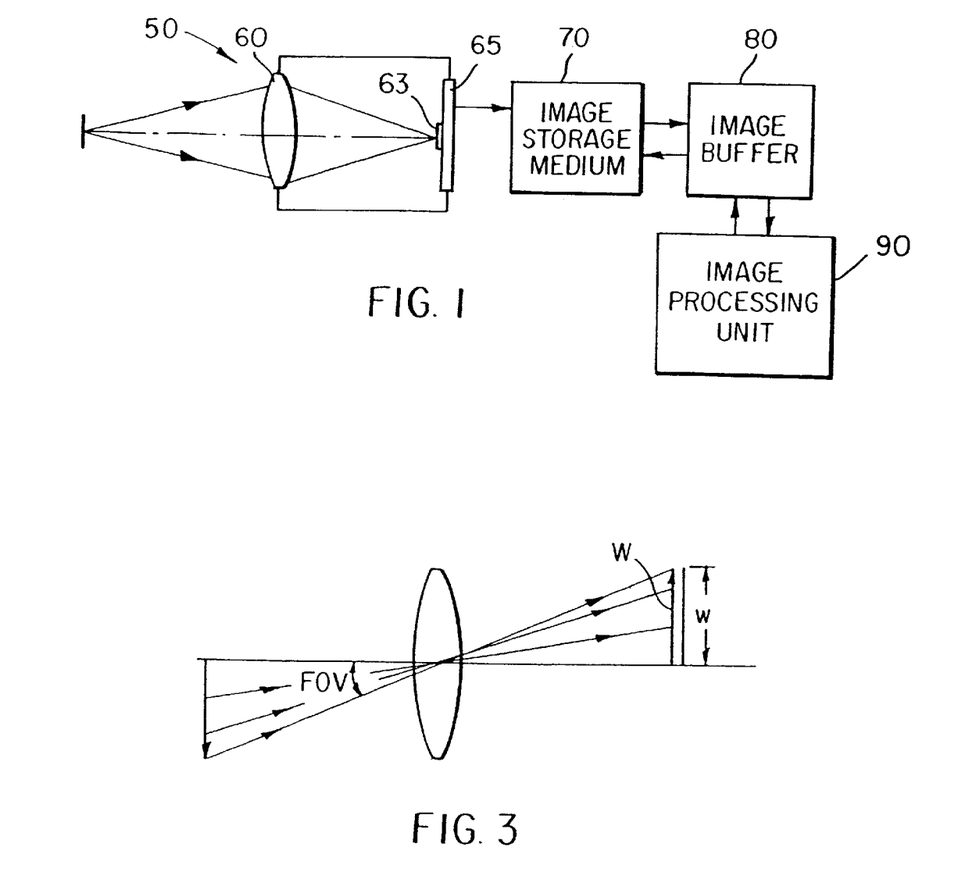
FIG. 1 illustrates schematically an apparatus for capturing and correcting of distorted images.
FIG. 3 illustrates schematically a perfect lens with the chief rays within a predetermined field of view (FOV) filling a sensor array.

The overall apparatus for forming distortion free images is illustrated in FIG. 1 and includes: (i) a rotationally symmetric lens 60 capable of forming a distorted image 63 and of introducing lateral color aberration; (ii) a photosensitive image capture medium 65 capable of capturing the distorted image 63 created by the lens system 60; (iii) an image storage medium 70 storing the data representing the distortion free image 63 captured by the image capture medium 70; (iv) an image buffer 80 for at least temporarily holding the data representing the distorted image 63; and (v) an image processing unit 90 transposing this data to a set of data that represents an distortion free image in the image buffer. The image processing unit 90 has information describing distortion and lateral color aberration characteristics of the lens 60. The image processing unit 90 calculates, for at most one quadrant of the image, given any ideal radial position of an image pixel, the actual radial position of the corresponding pixel of the distorted image from which to retrieve the data. Then the image processing unit 90 moves to the buffer data corresponding to the radial value of the pixel from the distorted image 63 to its undistorted pixel location in each quadrant of the image, thereby building data that corresponds to a corrected image. The data corresponding to the corrected image is originally stored in the image buffer 80 and is moved from the image buffer 80 to the image storage medium 70. This is done in order to minimize the amount of required memory. Thus, it is preferable that this apparatus overwrites the distorted image data in the image storage medium 70 by the corrected image data from the image buffer 80.

The method of designing a proper lens 60 that, in combination with the image capture medium, allows the distorted image 63 to optimally fill the image capture medium 65 (for example, a sensor array) and, the details of the method for removal of distortion and lateral color aberrations from the formed images are described below in detail. More specifically, in digital camera applications one has the opportunity to design a lens having large distortion and lateral color and which is optimized for a selected sensor array. This method is outlined in FIG. 2. Generally, large amounts distortion in the lens cause non-optimal sensor array use because the distorted image does not exactly fill the sensor. The method of FIG. 2 ensures that the distorted image produced by a lens just fits within a predetermined image area. The first few steps ( 100 to 130 ) of the method insure that a lens is designed not to have excessive distortion in order to make the most efficient use of the sensor array. Also, step 120 shows that the initial lens may be designed so that the rays within the paraxial field of few (FOV) fit the sensor. This is shown in FIG. 3.

Figure 2:
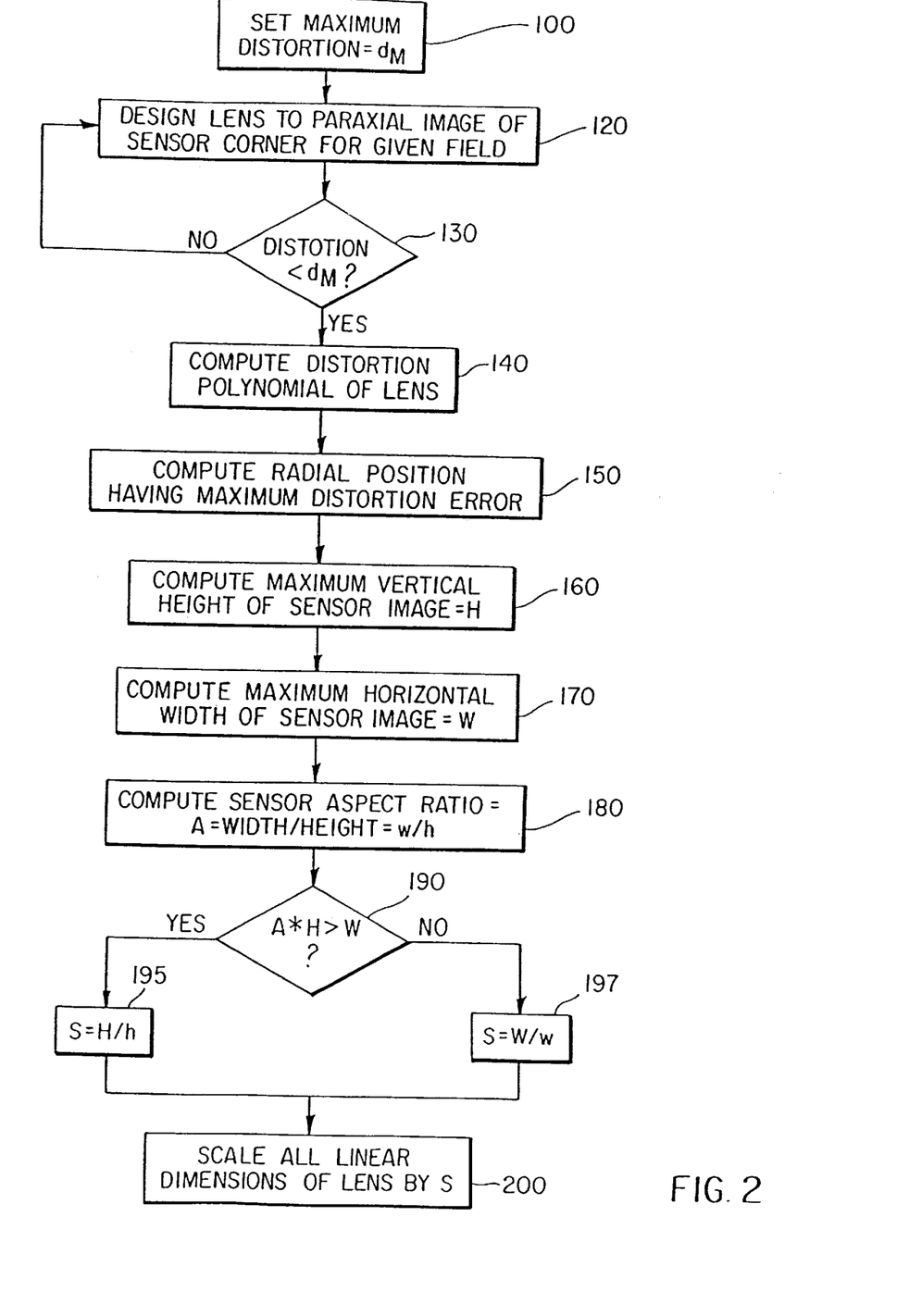
FIG. 2 is a flowchart of the steps used to design a lens with distortion. This lens is designed to produce a distorted image that at a full field of view just fits within the Predetermined image area.

The distortion polynomial of the lens 60 is calculated in step 140 of the method of FIG. 2. This distortion polynomial characterizes distortion introduced by the lens 60. The distortion polynomial relates the ideal image point to its location on the distorted image 63. It is characterized by the distortion coefficients $A_\lambda$, $B_\lambda$, $C_\lambda$, . . . ,etc. A number of actual and paraxial chief rays at different field angles are traced in order to determine the proper distortion coefficients corresponding to various field of view. (This can be done with commercially available lens designs and analysis programs such as, for example, CODEV, available from Optical Research Associates, of Pasadena, Calif.) A chief ray is an oblique light ray lying midway between the upper and lower limiting light rays passing through the lens at that obliquity. The paraxial chief ray position represents the position of the chief ray at the image formed by a perfect (i.e., distortionless) lens. An actual chief ray position in the image surface is the position of the chief ray at the image formed by the lens system that has aberrations.

Figure 4:
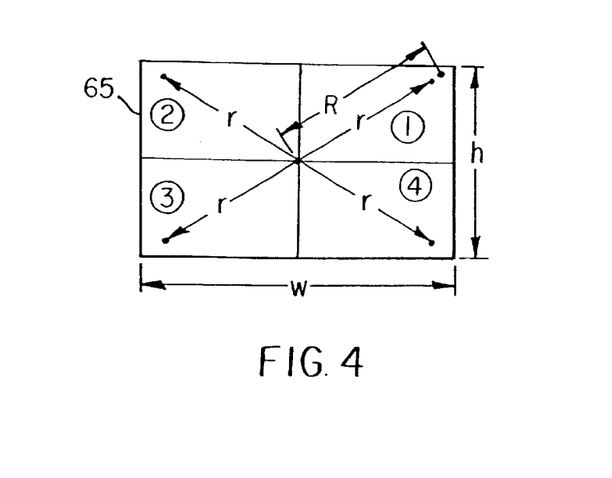
FIG. 4 shows the dimensions w and h of the sensor array.

The lens surface characteristics are assumed to be rotationally symmetric about an optical axis. Let the actual chief ray position $R(\lambda)$ at the image be defined as the radial distance from the image center for an arbitrary field of view at some wavelength of light $\lambda$ and the corresponding paraxial chief ray radial distance from the image center be defined as $r(\lambda)$. (See FIG. 4). According to this embodiment of the present invention, image data corresponding to the distorted image position, $R(\lambda)$, will be moved to the undistorted image position $r(\lambda)$, thus removing the effect of distortion from the final image.

The position of the actual chief ray $R(\lambda)$ for a rotationally symmetric lens can be described as a polynomial function of $r(\lambda)$ of odd powers only, as follows:

$$R(\lambda)=r(\lambda)+A_\lambda r^3(\lambda)+B_\lambda r^5(\lambda)+C_\lambda r^7(\lambda)+ \ldots \quad (1)$$

When the lens design is finished, a ray trace is performed and the positions of the actual and paraxial chief rays are determined for various field angles. Then the relationship between the actual chief ray and the paraxial chief ray positions is determined by finding the appropriate coefficients $A_\lambda$, $B_\lambda$, $C_\lambda$, etc. This corresponds to step 140 of FIG. 2. This may be done by various known methods, such as a least squares fit to a number of field points. In most cases, only a few terms are needed to describe the actual chief rays position with enough accuracy. Given these coefficients, $A_\lambda$, $B_\lambda$, $C_\lambda$, and the ideal pixel location $r(\lambda)$ one can now easily calculate the location $R(\lambda)$ of any corresponding pixels. If the lateral color aberration introduced by the lens is negligible, the calculation of the coefficients $A_\lambda$, $B_\lambda$, $C_\lambda$ may be performed for only one wavelength of interest.

If one is supplied with an actual lens, rather than a known lens design, the distortion characteristics of a lens can be determined by measurement of the image produced by the lens, and the coefficients $A_\lambda$, $B_\lambda$, $C_\lambda$, etc. can be determined from these measurements.

Steps 150 through 200 of the method of FIG. 2 are used to determine how to best scale the designed lens to the image sensor in order to minimize the number of sensor pixels not being used. One would have to trace a number of actual chief rays corresponding to the periphery of the sensor array (or the periphery of the predetermined image area) in order to determine both the maximum vertical height H of the distorted image of the sensor and its maximum horizontal width W. (See FIG. 4). If the lens is perfect, the position of the actual and paraxial chief rays will be the same. However, most lenses are not perfect, thus these positions are different. The aspect ratio A of the sensor is defined as the sensor array's width w divided by the sensor array's height h. This aspect ratio A is used to determine whether and by how much to scale the designed lens. In a perfect lens W=w and H=h. If, however, the lens introduces distortion, then W≠w and H≠h. Thus, if A·H is larger than W, the image will be larger than the sensor array and some of the data will be lost. If A·H is smaller than W, the image is smaller than the sensor array and not all of the sensor's pixels are utilized. More specifically, steps 180 and 190 determine the scaling factor for the lens design. The lens design is then scaled by this scaling factor in step 200. That is, in step 200 of the method, one applies the scale factors to all linear dimensions of the lens data (i.e., radii, thicknesses of lens elements, spacings, etc.). This also changes the focal length of the lens design by the same scale factor. If A·H>W, all of the linear dimensions of the designed lens are scaled to fit the sensor height and to ensure that all data in the field of view fits the width of the sensor. If A·H<W, then all linear dimensions are scaled to the sensor width and to ensure that the data fits within the sensor height. This final lens design then (i) produces an image for the designed object field which best fits the sensor without having any image falling outside the sensor boundaries; and (ii) has the largest part of a rectangular image boundary just touch the edge of the sensor. That is, the final lens design will produce a distorted image that, in a full field of view, just fits inside a predetermined image area. Two examples illustrating how the scale factor is determined are provided later in the specification, one for the lens design that has a positive third order distortion and one for the lens design that has a negative third order distortion.

Let the above determined scale factor be defined as s, the distorted real radial image position on the photosensitive medium be Rs, and the desired undistorted radial image position (determined by the position of the paraxial chief ray) be $r_s$. Then the radial coordinates of the scaled image (i.e., an image created by the scaled lens design) are related to the original paraxial image radial coordinates, $r(\lambda)$, by: $r(\lambda)=s_\lambda r_s$. The scale factor, $s_\lambda$, will depend on the wavelength $\lambda$. One should choose the wavelength scale factor $s=s_\lambda$ of the lens so as to minimize data loss. It is preferred that for the lenses with distortion of more than 6%, the scaling factor's be: $\delta \geq 1.05$, or $\delta \leq 0.95$.

With this substituted into equation 1, the result relates an undistorted image point position to its distorted radial position:

$$R_s(\lambda)=s_\lambda r_s+A_\lambda(s_\lambda r_s)^3+B_\lambda(s_\lambda r_s)^5+\ldots \quad (2)$$

where $R_s$ is the actual location where the image data (corresponding to the undistorted image position $r_s$) is placed by an actual lens with distortion. In order to optimize the use of the image area, it is preferred that the actual lens is built according to the scaled lens design. According to an aspect of the present invention, the image data corresponding to the distorted image position, $R_s$, is moved to the undistorted image position, $r_s$. Once the coefficients $A_\lambda$, $B_\lambda$, etc. are known, and the radial position in the undistorted image point is determined from the paraxial chief ray, the actual distorted image position for that image point is computed from equation 2 and the data can then be moved from that position to the position that corresponds to the correct location. This is discussed in more detail later in the specification. Due to radial symmetry, once the mathematics has been performed for one radial position, the data from the four quadrants of the image can be moved to their correct positions because each one has the same radial distance.

Figure 5:
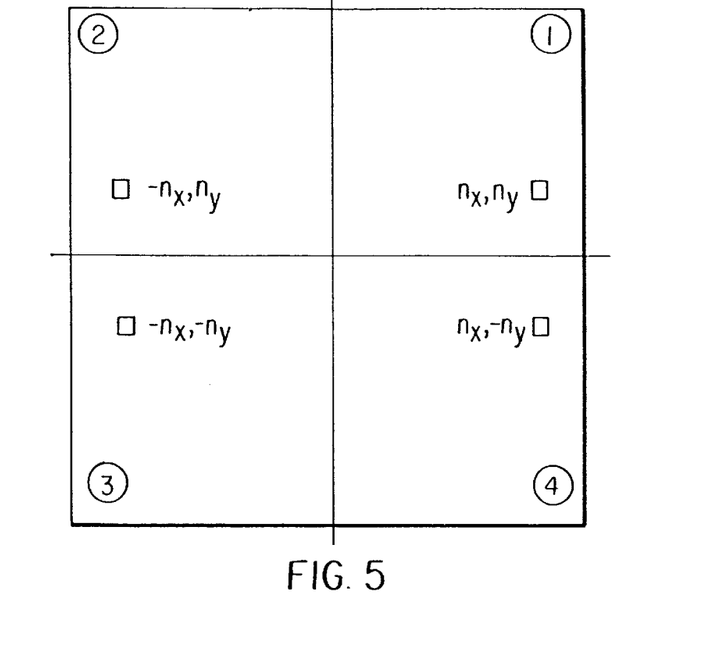
FIG. 5 shows the numbering of pixels in the four quadrants of the image area.

FIG. 5 illustrates a method for identification-of each quadrant of the image and for the numbering of pixels in each of the quadrants. Quadrant one contains a pixel that is identified with X and Y pixel numbers $n_x$ and $n_y$, which are both positive. Quadrant two pixels have X pixel numbers that are negative and Y pixel numbers that are positive. Quadrant three has X and Y pixel numbers that are both negative. Quadrant four has pixels that have a positive number $n_x$ in the X direction and a negative number $n_y$ in the Y direction. This follows standard mathematical definitions of Cartesian coordinates.

Figure 6:
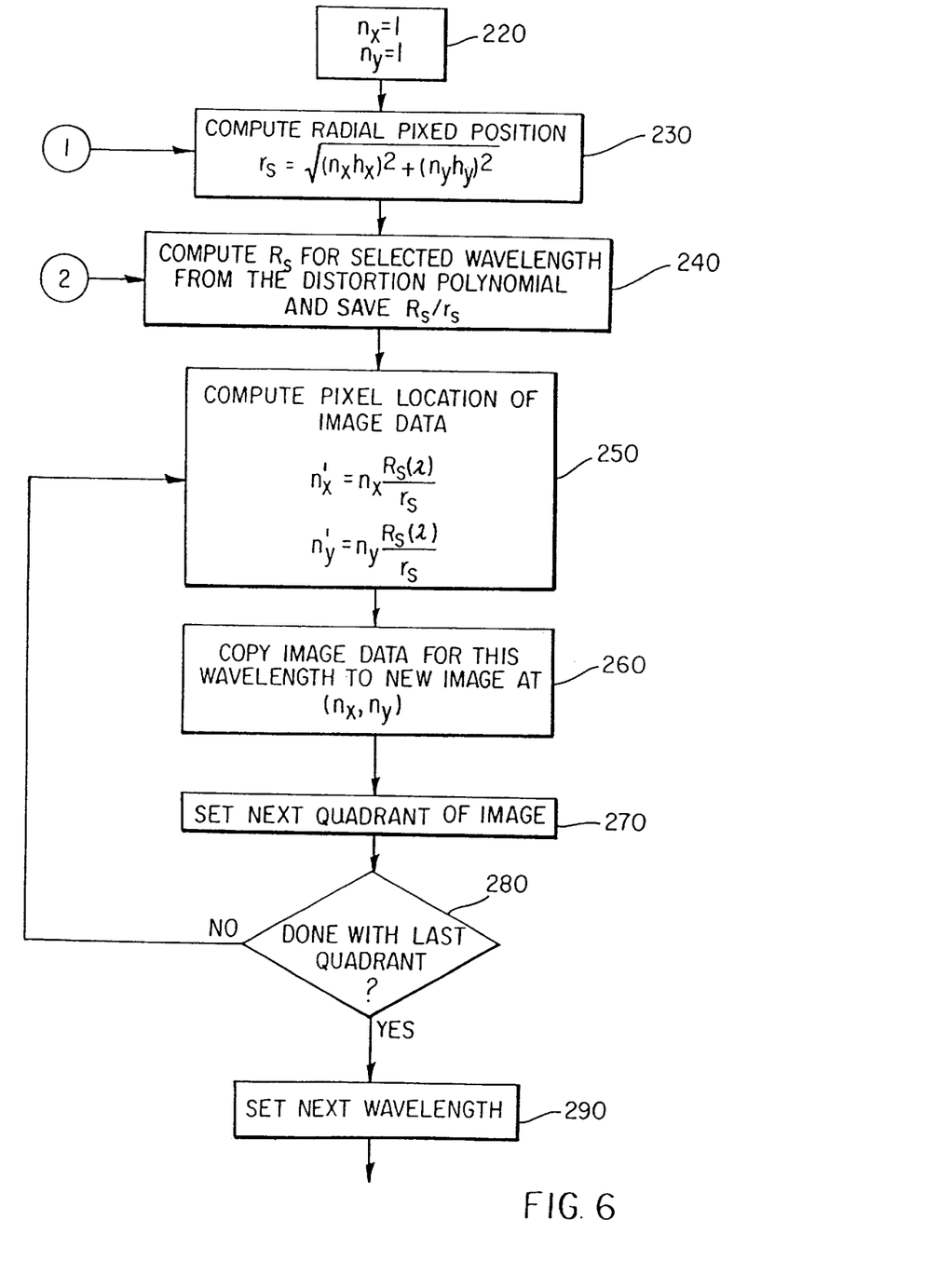
FIGS. 6 and 7 are a flowchart of the steps used to correct an image for distortion and lateral color aberrations.
Figure 7:
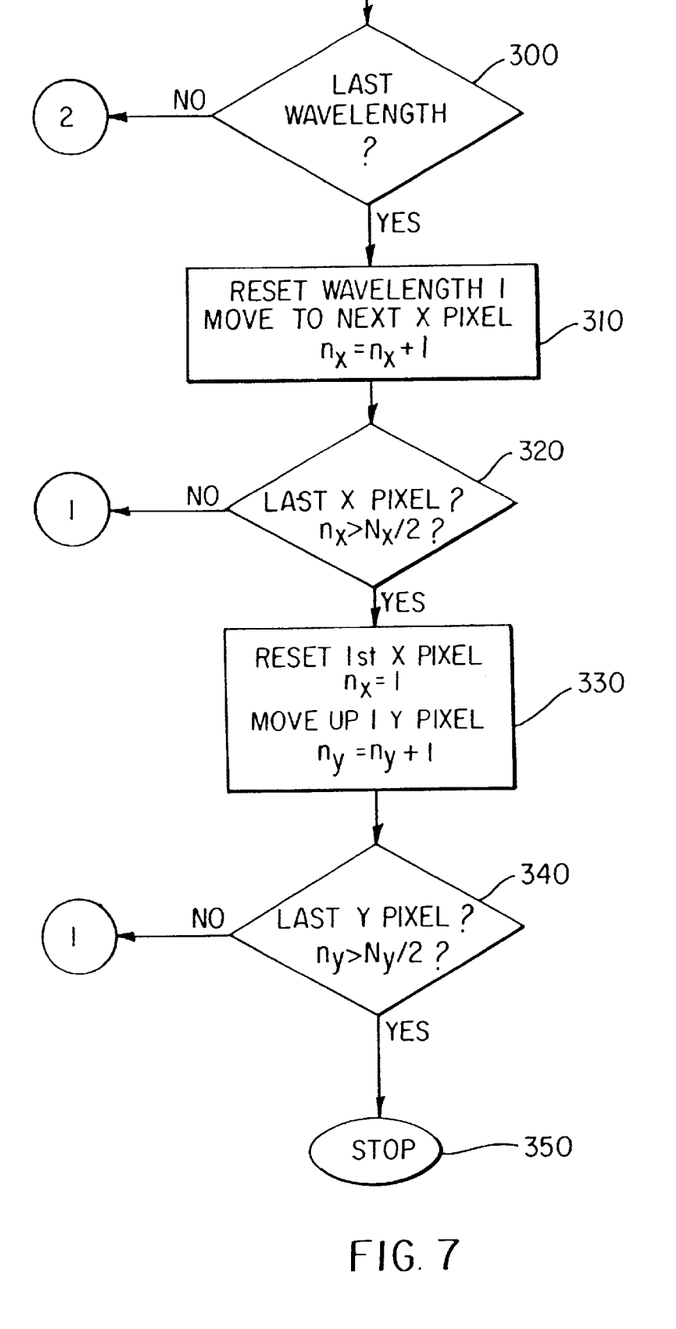

FIGS. 6 and 7 show a flowchart identifying the steps taken to construct a corrected image according to the preferred embodiment of the present invention. According to this method a corrected image is built by getting the data for each pixel of the corrected image from the data corresponding to the distorted image.

For example (see FIG. 6, step 220), one may start at the origin with a pixel characterized by $n_x$ and $n_y$ that are equal to one, and that is located in the first quadrant of the image to be constructed. In this flowchart, and in the rest of the specification, the unprimed numbers identify the corrected image to be constructed. The primed numbers will identify the location of the pixels where the distorted image is located. In step 230, the radial distance $r_s$ to the center of this pixel is computed:

$$r_s=\sqrt{(n_x h_x)^2+(n_y h_y)^2}$$

In this equation, $h_x$ is the pixel pitch in the X direction and $h_y$ is the pixel pitch in the Y direction of the ideal (i.e., undistorted image). Thus, the pixel having undistorted image data has coordinates $(n_x h_x, n_y h_y)$, where $n_x$ is the number of pixels in the X direction from the origin, and $n_y$ is the number of pixels in the Y direction from the origin. From the predetermined polynomial equation and scale factor described in connection with equation 2, the radial distance $R_s$ of the corresponding distorted image location is found in step 240. At this step it is advantageous to store the ratio $$\frac{R_s}{r_s}$$

of the radial positions because this value will be used at least four times. This value is used for this pixel and at least for three other pixels with the same $r_s$ value.

The numbers $n_x'$, $n_y'$ identifying the pixel with the distorted pixel image data are computed in step 250. The pixel number in X and Y of the aberrated image are:

$$n_x' = \pm n_x \frac{R_\lambda}{r} \quad (3)$$

$$n_y' = \pm n_y \frac{R_\lambda}{r} \quad (4)$$

In order to locate the nearest aberrated pixel corresponding to the nonaberrated data pixel the numbers $n_y'$ and $n_x'$ must be integers. Thus, these numbers are rounded to their nearest integer value.

In step 260 the data from this pixel is copied to the image buffer containing the corrected image. That is, the data from the pixel $n_x'$, $n_y'$ (from the image area) is moved to the undistorted pixel location (of the buffer) which is identified as $n_x$, $n_y$. The next corresponding pixel of the next quadrant is set in step 270 by simply changing the appropriate sign of the X or Y coordinate according to the definition of the quadrants above. The data in pixels identified as $-n_x$, $n_y$; $-n_x$, $-n_y$; and $n_x$, $-n_y$, all have the same radial positions $r_s$ and corresponding distorted position $R_s$. Because there is rotational symmetry, one need calculate $R_\lambda$ and r only once to get four locations, one in each quadrant: $(n_x h_x, n_y h_y)$, $(-n_x h_x, n_y h_y)$, $(-n_x h_x, -n_y h_y)$, $(n_x h_x, -n_y h_y)$. So, the mathematics needs to be computed for one fourth the total number of pixels. The image data stored at the primed coordinates is transferred to the correct or desired image locations. It should be noted that generally, the image data at each of these four positions is different, but each pixel has the same undistorted and distorted image radial positions $r_s$, $R_s$. In addition, if the pixels are arranged in a square pattern (pitch wise), the symmetry is eight-fold and by doing the calculations for the ½ of any one quadrant all the image data can be shifted to the correct location in the image buffer. Thus, the data corresponding to this pixel and other corresponding pixels are also copied to the image buffer containing the corrected image for other pixel(s). Therefore, one can process data for each of the four quadrants by calculating one radial position of a pixel in only one quadrant.

To minimize computations, one should repeat steps 240–290 for each wavelength of interest before moving to a next radial position $r_s$ in step 290. That is, due to chromatic aberrations a pixel $n_x$, $n_y$ may have several corresponding pixels containing image data of $n_x'$ and $n_y'$, different wavelengths. Thus, if the lens has significant chromatic aberrations, new pixel numbers $n_x'$ and $n_y'$ need to be calculated for each color. A new value of $R_s$ for the selected wavelength needs to be computed because the coefficients $A_\lambda$, $B_\lambda$, $C_\lambda$, etc. of equation 2 can depend on the wavelength. Thus, if there are three wavelengths of interest and distorted image data in each of the wavelengths is in a different pixel of the sensor, the distorted data from each of the three pixels may need to be moved to a single pixel location $n_x$, $n_y$ in the buffer. Once all the calculations for the last wavelengths of interest of the selected pixel are performed in step 300 of FIG. 7, the next pixel is selected as in step 310 and the calculation is repeated for each pixel in X row (i.e., each pixel with the same $n_y$ value) until the last $n_x$ value is reached (step 320). Then the Y pixel value is incremented and we repeat steps 230–310 for all the pixels in the X direction for this Y value (step 330) until the last Y and X pixel data is processed (steps 340, 350). While this flowchart shows the X value of pixel being incremented first, it is understood that other methods of selecting pixels can be used. The flowchart shows the pixels with the corrected data from quadrant one being built in a raster fashion and that simultaneously each of the other quadrants are being constructed. This is due to the rotational symmetry of the lens. If the pixels of the image sensor are square, a further increase in speed can be gained because a corresponding pixel (i.e., a pixel with its X and Y values interchanged) also has the same radial location. One would only need to process $R_s$ for half of the pixels of quadrant one. These pixels could be either the pixels above or below a 45 degree line from the origin to the corner of quadrant one. Once all the X pixels in the raster scan are computed, the next Y value is done until all the pixels of quadrant one are processed in step 330 to 350.

In order to perform the data correction rapidly, it is preferred to have a buffer within the camera large enough to contain at least one image. After the corrected image is built in the buffer, it is moved back to the original distorted image location and overwrites the original data which is no longer needed. It would be necessary to have within the camera the ability to keep track and time the correction of the images. While it is preferred to do the correction within the camera, another method is to download the image data to a computer or workstation along with the distortion polynomials as described in equation 2. Each image could then be corrected within the computer.

While the preferred method is applied to digital cameras, it can also be used for conventional cameras. In this case, in order to obtain the polynomials as described in equation 2 for the distortion correction it would be necessary to measure the lens parameters defining a conventional camera lens and to determine the lens distortion characteristics. The conventional camera could also provide a computer with the lens information such as the type of lens used, its focal length, field angle, the values of s, $A_\lambda$, $B_\lambda$, $C_\lambda$, etc. The polynomial information could also be written on the film by the camera and later read from the film by a scanner, when the film image is digitized. A kiosk comprising a computer is operatively connected to the camera or a scanner and receives the distorted image data and the above mentioned lens information. The kiosk, utilizing the lens information determines the positions of data in the distorted image that corresponds to a predetermined ideal image location and moves this data representing an undistorted image.

Figure 8:
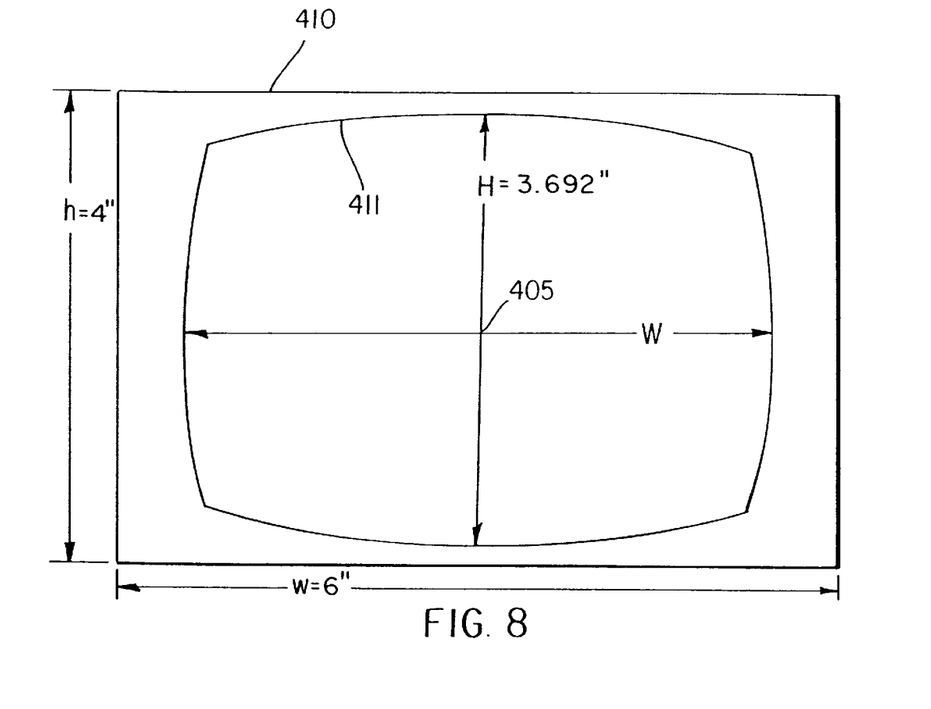
FIG. 8 shows the edge of a rectangular image format and its image, provided by a lens wit a −25% distortion.

Two detailed examples of determining the optimum scaling factors are provided below. In the first example the lens has a pure third order barrel distortion of −25%. FIG. 8 shows image center 405, the edge of a rectangular image format, 410, and its distorted image 411. For this lens, equation 1 becomes:

$$R=r-0.01923077r^3 \quad (1A)$$

In this equation, r is the radial distance from the image center 405 to a paraxial image point (i.e. paraxial chief ray intercept with the image surface) and R is the radial distance from the image center 405 to the exact image chief ray intercept with the image surface. In this equation, the A coefficient is −0.01923077 and it has dimensions of inverse length squared, so it is −0.01923077 per square inch. The original rectangle (i.e., the desired image of the photographed object) was 4 inches by 6 inches in size. Thus, the image 410 shown in FIG. 8 has an aspect ratio of 3 to 2, that is the long side of the image is 50% longer than the short side.

Figure 9:
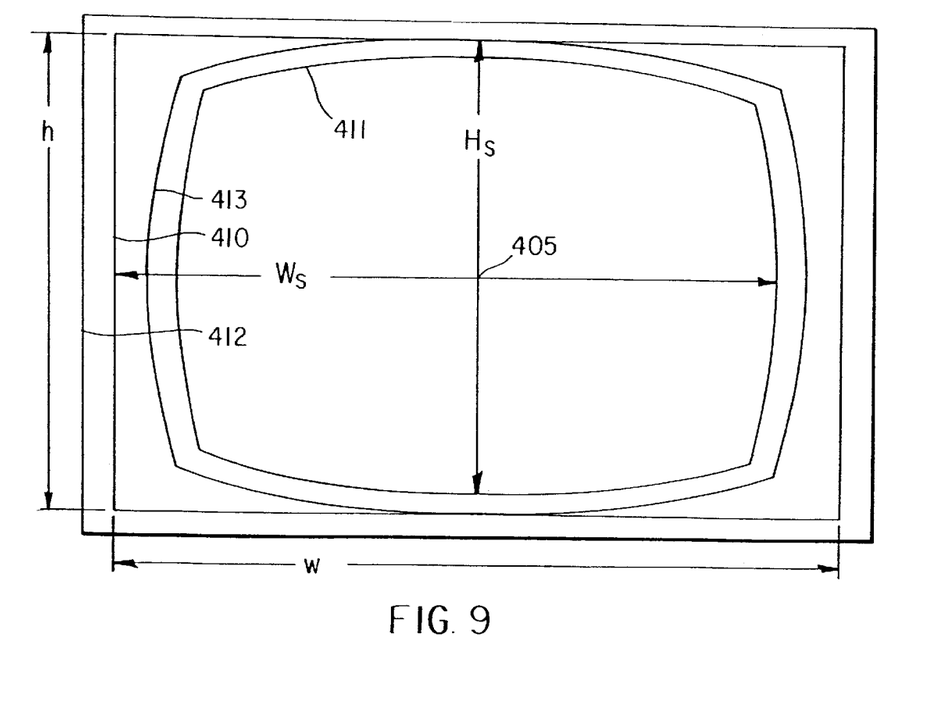
FIG. 9 shows the scaled distorted image and the paraxial image of the 4×6 rectangle illustrated in FIG. 8, both scaled by the same scale factor.

In order to keep the same object field coverage and in order to maximize the number of sensor pixels used in image capture (which would result because the distorted image does not fill the image receiving area defined by the rectangle as much as possible), it is necessary to scale the designed lens focal length by the vertical height of the rectangle (defining the image area) divided by the vertical height of the distorted image. In this case, the vertical height (h) of the rectangle defining the image is 4 inches, and the vertical height (H) of its distorted image is 3.692. This gives a scale factors of 1.0834. The effect of scaling the lens focal length is to scale all its linear dimensions. Thus, the actual focal lengths of this lens will be 8.3% larger than the focal length of the corresponding ideal lens that fits the image sensor at the same field angle. After this is done, the distorted scaled up image 413 will best fill the image receiving area with minimum image data loss as shown in FIG. 9. More specifically, FIG. 8 shows the edge of the original unscaled 4×6 inch rectangular image as 410. The distorted image of 410 is 411. The scaled distorted image is 413 and 412 is the paraxial image of the 4×6 inch rectangle scaled up by the same scaling factor and shown in FIG. 9. It can be seen that now the scaled distorted image 413 just touches the image receiving area 410 at the top and bottom of the rectangle. The image receiving area is of a given fixed dimension and therefore cannot be changed. If the image receiving area is a digitizing photosensitive sensor such as a CCD or a CMOS array, then more pixels will be obtained from the lens with the scaled focal length, resulting in better image quality.

The next example is for positive distortion which is called pincushion distortion. In this case, the lens introduces 25% distortion, so the equation describing the distorted image is:

$$R=r+0.01923077r^3 \quad (1B)$$

Figure 10:
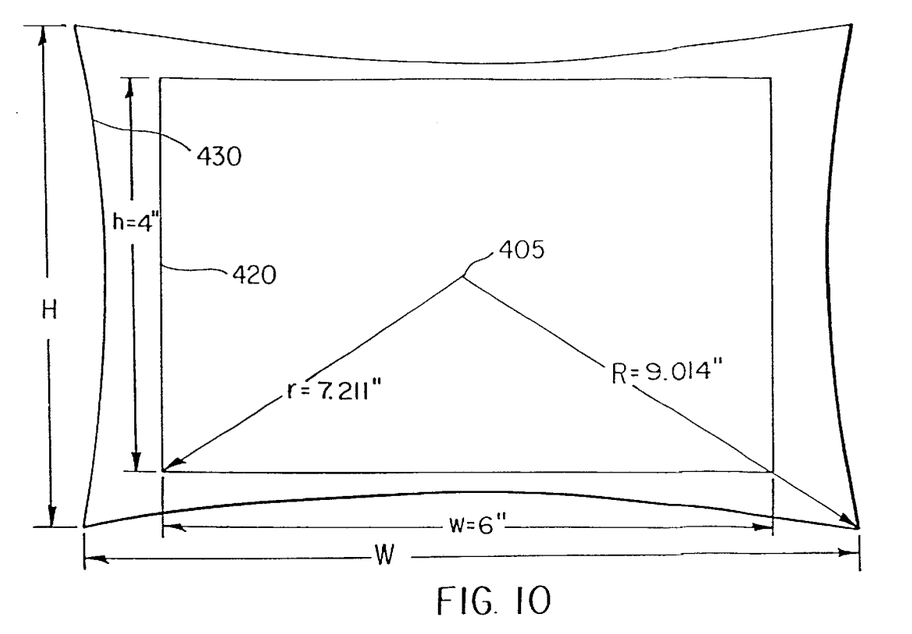
FIG. 10 shows the edge of a rectangular image format and its image, provided by a lens with a +25% distortion.
Figure 11:
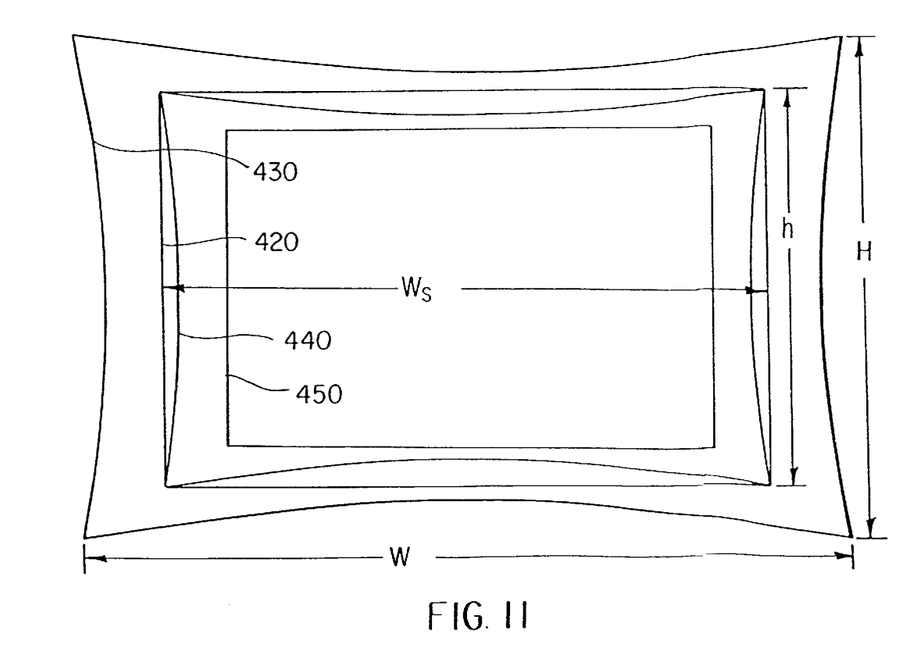
FIG. 11 shows the scaled distorted image and the paraxial image of the 4×6 rectangle illustrated in FIG. 10, both scaled by the same scale factor.

FIG. 10 shows the edge of the 4×6 inch rectangular image receiving area 420, and its distorted image 430. In this case, to minimize data loss and make best use of the image receiving area, it is necessary to scale the lens focal length to a smaller value so that the corners of the distorted image fit within the image receiving area. If one computes the radial distance from the center of the image to the distorted corner of the 4×6 inch rectangle, this results in a 9.014 inches diagonal (R) while the diagonal of the 4×6 rectangle is 7.211 inches. The scale factor for focal length reduction is therefore 0.8. Thus, the actual focal length of the lens is 20% smaller than the focal length of the ideal lens that fits the image sensor at the same field angle. Applying this scale factor to the lens focal length results in the distorted image filling the image receiving area as shown in FIG. 11.

The edge of the original 4×6 image receiving area is 420 and its distorted image is 430 as in FIG. 10. The scaled distorted image is 440 while the scaled paraxial image is 450. As can be seen, the corners of the scaled distorted image touch the edge of the image receiving rectangle, 420, so no image data will be lost. This also makes best use of the image receiving area.

Figure 12:
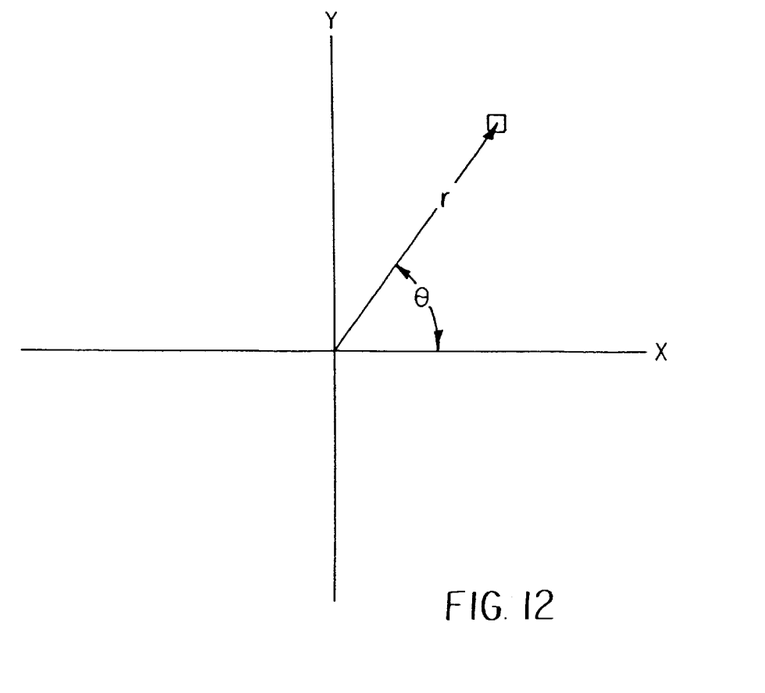
FIG. 12 is an illustration of a pixel with an undistorted image data. This pixel is defined by a radial distance r from the image center and an angular value θ.

Equations 3 and 4 will now be derived. From FIG. 12 which shows a vector to a pixel whose angle from the X axis is θ and whose radial distance from the center is r, the X and Y coordinates of the pixel are given by:

$$x = r\cos(\theta) \quad y = r\sin(\theta) \tag{5}$$

With the X and Y pixel pitches $h_x$ and $h_y$ respectively, the number of X pixels $n_x$ and the number of Y pixels $n_y$ are given by:

$$n_x = \frac{x}{h_x} = \frac{r\cos(\theta)}{h_x} \tag{6}$$

$$n_y = \frac{x}{h_y} = \frac{r\sin(\theta)}{h_y}$$

Because of rotational symmetry, the distorted pixel is located at the same angle $\theta$ above. Likewise, the coordinates of the distorted image at R=(X,Y) are given by:

$$n'_x = \frac{R\cos(\theta)}{h_x} \tag{7}$$

$$n'_y = \frac{R\sin(\theta)}{h_y}$$

The angle $\theta$ of the pixel is given by:

$$\tan(\theta) = \frac{y}{x} \tag{8}$$

It is possible to compute the sine and cosine as:

$$\sin(\theta) = \pm \frac{\tan(\theta)}{\sqrt{1 + \tan^2(\theta)}} \tag{9}$$

$$\cos(\theta) = \pm \frac{1}{\sqrt{1 + \tan^2(\theta)}}$$

If we express y and x in equation 8 in terms of the number of pixels $n_x$ and $n_y$ from equations 6, the sine and cosine can be written:

$$\sin(\theta) = \frac{\pm n_y h_y}{\sqrt{(n_x h_x)^2 + (n_y h_y)^2}} \tag{10}$$

$$\cos(\theta) = \frac{\pm n_x h_x}{\sqrt{(n_x h_x)^2 + (n_y h_y)^2}}$$

Or, $$\sin(\theta) = \frac{\pm n_y h_y}{r} \tag{11}$$

$$\cos(\theta) = \frac{\pm n_x h_x}{r}$$

These results for the sine and cosine can be substituted back into equations 7 to get:

$$n'_x = \pm \frac{R}{h_x} \frac{n_x h_x}{r} = \pm n_x \frac{R}{r}$$

$$n'_y = \pm \frac{R}{h_y} \frac{n_y h_y}{r} = \pm n_y \frac{R}{r}$$

And these are equations 3 and 4.

The invention has been described in detail with particular reference to certain preferred embodiments thereof, but it will be understood that variations and modifications can be effected within the spirit and scope of the invention.

PARTS LIST 50 apparatus
60 lens
63 distorted image
65 photosensitive image capture medium
70 an image storage medium
80 an image buffer
90 an image processing unit

What is claimed is:

1. An apparatus for producing a distortion-free image, said apparatus comprising:

a rotationally symmetric lens system capable of forming a distorted image and of introducing lateral color aberration;

a photosensitive image capture medium capable of capturing said distorted image created by said lens system;

an image storage medium storing data representing said distorted image captured by said image capture medium;

an image buffer for holding data representing distortion free image;

an image processing unit transposing said data representing said distorted image to a set of data that represents a distortion-free image; said image processing unit having information describing distortion and lateral color aberration characteristics of said lens system, and said image processing unit being adapted to calculate for at most one quadrant of the image, given any ideal radial position of a pixel, the actual radial position of the distorted data pixel from which to retrieve the data, move the data corresponding to the radial value of the pixel with the distorted data to its undistorted pixel location in each image quadrant, thereby building a distortion-free image;

store the data representing said distortion-free image in said image buffer medium; and move said data representing said distortion-free image from said buffer to said image storage medium.

2. An apparatus according to claim 1, wherein said apparatus overwrites said distorted image data in said image storage medium by said data representing said distortion-free image.

3. An apparatus according to claim 1, wherein said image capture medium is a CCD array.

4. An apparatus according to claim 1, wherein said image capture medium is a CMOS array.

5. An apparatus according to claim 1, wherein said apparatus is a photographic camera and said image storage medium is part of said camera.

6. An apparatus according to claim 1, wherein said apparatus is a photographic camera and said image processing unit is part of said camera.

7. An apparatus according to claim 1, wherein said apparatus includes: a photographic camera, and a separate computer containing said image processing unit.

8. An apparatus according to claim 7, wherein image storage medium is part of said camera.

9. An apparatus comprising:

a lens with a predetermined full field angle of more than 50 degrees, said lens having at least ±6% distortion;

a photosensitive medium receiving a distorted image created by said lens, said photosensitive medium being of a size such that at said full field angle the distorted image just fits within said photosensitive medium and the paraxial image corresponding to this field angle does not touch the sides of said photosensitive medium; and an image processing unit processing said data representing said distorted image transposing said data to represent an undistorted image, wherein said distorted image has a corresponding distortion-free image whose data point locations are characterized by r(λ) and the location of the corresponding data point of said distorted image is characterized by a radial distance R(λ) such that R(λ) is determined from r by the following equation $$R(\lambda)=r(\lambda)+A_\lambda r^3(\lambda)+B_\lambda r^5(\lambda)+C_\lambda r^7(\lambda)+ \ldots$$

where A, B, C . . . are known coefficients that describe the distortion characteristics of said lens.

10. An apparatus according to claim 9, wherein said undistorted image is 94% to 106% of the size of said photosensitive medium.

11. An apparatus according to claim 9, wherein said photosensitive medium is a sensor array with a plurality of pixels and said undistorted image is made of a number of data points such that said number of data points is 94% to 106% of pixels of said photosensitive medium.

12. An apparatus according to claim 9, further comprising an image processing unit adapted to move the data corresponding to data point locations R(λ) to data point locations r(λ), thereby creating an image data set representing said distortion-free image.

13. An apparatus comprising:

a camera capturing images with at least 6% distortion, said camera containing a file with at least one of the following parameters: coefficients describing distortion, lens scale factor, full field angle and lens focal length; and a kiosk comprising a computer operatively connected to said camera, wherein said kiosk receives (i) said distorted image data corresponding to said captured images and (ii) said file and, utilizing said parameters, determines positions of data points that correspond to a predetermined ideal location; and moves said data to said ideal location, thereby creating a distortion-free image, wherein said distorted image data has a corresponding distortion-free image whose data point locations are characterized by r(λ) and the location of the corresponding data point of said distorted image is characterized by a radial distance R(λ) such that R(λ) is determined from r by the following equation:

$$R(\lambda)=r(\lambda)+A_\lambda r^3(\lambda)+B_\lambda r^5(\lambda)+C_\lambda r^7(\lambda)+ \ldots$$

where A, B, C . . . are known coefficients that describe the distortion characteristics of said lens.

14. A method of producing a distortion-free image, said method comprising the following steps:

(i) producing an image with at lest 6% distortion;

(ii) finding, for a predetermined image location of said distortion-free image, a corresponding location in said distorted image;

(iii) copying data located at said corresponding location of said distorted image into said predetermined image location and copying corresponding data from three other quadrants of said distorted image into their corresponding locations in said distortion-free image, wherein said corresponding image locations are characterized by the same radial distance from the center of the distortion-free image.

15. A method of producing a distortion-free image according to claim 14 wherein said method further includes scaling said distortion-free image to exactly fit a sensor array.

* * * * *